United States Patent Office 3,415,108
Patented Dec. 10, 1968

3,415,108
PORTABLE GAS ANALYZER WITH REMOTE-
INDICATING FACILITY
Rolf Hübner, Westfalendamm 267,
Dortmund, Germany
Continuation-in-part of application Ser. No. 427,047
Jan. 21, 1965. This application Jan. 17, 1966, Ser.
No. 521,104
Claims priority, application Germany, Jan. 16, 1965,
H 54,880
5 Claims. (Cl. 73—23)

ABSTRACT OF THE DISCLOSURE

A portable gas-analyzer system in which a concentration-measuring device determines the concentration of a component of a gas mixture in a mine or the like at a station connected by a transmission line to a remote monitoring location while contacts are provided to enable the portable gas analyzer to be plugged in the measuring station and the monitoring station has switches for triggering a timing network in the gas analyzer.

---

Figure 1:
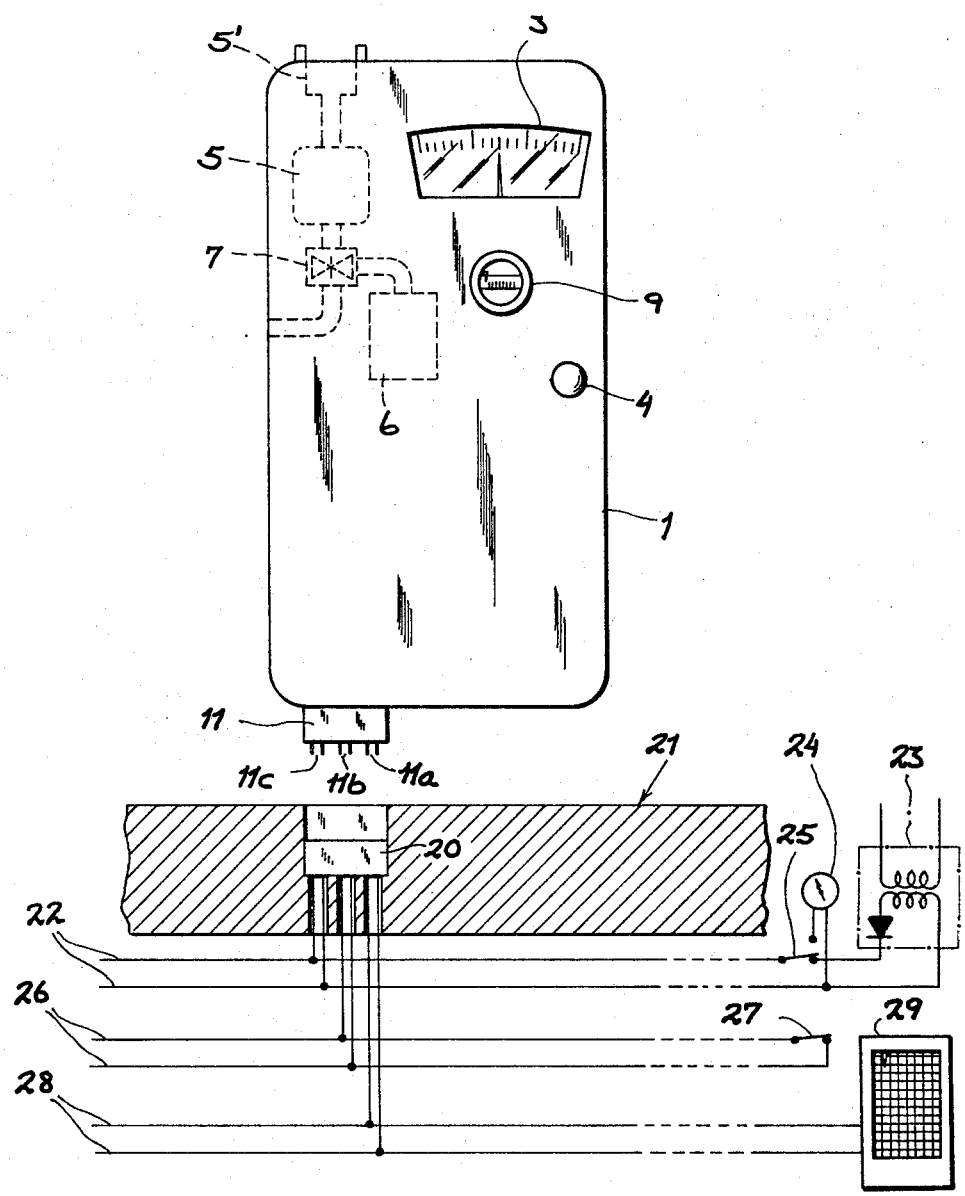

This application is a continuation-in-part of my copending application Ser. No. 427,047, filed Jan. 21, 1965.

My present invention relates to portable gas-analyzing devices for testing subterranean ambient atmospheres and determining the concentration of certain gases in such atmospheres. While many devices of this general type have been proposed, it has been found that excellent results can be obtained with portable gas analyzers of the type described in the aforementioned copending application and comprising, in a housing provided with a gas-testing chamber, a pump means for drawing ambient gases into the testing chamber, a source of electric current such as a rechargeable or replaceable battery, concentration-responsive means in the chamber sensitive to the proportion of one or another component of the gas stream, a measuring circuit connected with this sensor and with an indicator (e.g. a gauge) and timer means for initiating operation of the pump to draw the necessary quantity of gas into the chamber prior to energization of the measuring circuit to test the gas within this chamber. As noted in this copending application, it is advantageous to provide means for indicating the level of charge of the battery and, in addition, to provide a voltage-stabilizing circuit for the measuring network to overcome disadvantages which may arise from the considerable current drains resulting from pump operations.

Thus, in that system, there were provided three distinct networks including a power network for the circulating means (i.e. for inducing the flow of gas into the measuring chamber and ejecting it therefrom), a measuring network (e.g. a bridge circuit) for the main indicator and a voltage-stabilizing network inserted between the measuring network and the common power supply for the circulating means and the measuring means. An auxiliary indicator, connected to show the actual terminal voltage of a battery serving as the power source is connected across the latter ahead of the stabilizing network and, advantageously, can be calibrated directly in terms of number of tests still available with the existing battery charge; to this end, part of the power network is designed as a timing circuit which establishes a definite time interval during which current is drawn by the pump motor in the course of each test. Reference is made in this connection to my copending application Ser. No. 416,655 of Dec. 7, 1964 (now U.S. Patent No. 3,266,293).

Advantageously, a push-button switch is provided on the housing to close a circuit which energizes the gas-concentration meter and the battery-level meter, energizes a sensor disposed within a measuring chamber and furnishes a pulse to initiate aspiration of ambient gases by a pump for a period of invariable duration determined by the timing network.

It will be understood that such systems, which are especially advantageous for the analysis of methane, carbon-monoxide concentrations and the like in the ambient gases of a mine or other subterranean location have certain advantages over prior-art systems in that they do not require the care of earlier devices and are also not as sensitive to shock and handling. However, it is generally necessary to hold the actuating button in a depressed condition during the measuring cycle. Furthermore, it was necessary to provide complex means for supervising the devices and ensure that they would always be in a "ready" state. For this purpose, it was necessary to provide potentiometers or the like to reset the voltage delivered to the measuring network in accordance with the loss of potential at the battery or variations in the charge condition thereof. Moreover, these earlier systems required such continuous supervision or supervision at such frequent intervals as to require them to be used substantially only in the presence of an attendant.

It is an important object of the present invention to extend the principles set forth in my earlier-filed copending applications mentioned above and especially my application Ser. No. 427,047, to improved portable gas analysers whiuh require significantly less supervision and can be used in the absence of an attendant.

Another object of this invention is to provide an improved portable gas analyser which is capable of providing an indication of the concentration of one or more gases in a gas mixture both to a user carrying same and to a monitoring station remote from the measuring location with a high degree of accuracy and reproducibility.

Still another object of this invention is to provide a portable gas analyser of the character described which can be selectively operated by an attendant under direct control and fixedly located in a subterranean station and supervised by remote control and monitoring.

These and other objects of the invention, which will become apparent hereinafter, are attained with a portable gas analyser combining a feature of my copending application Ser. No. 427,047, namely the provision of means for adjusting and overseeing the preparedness of the device by providing a visual or other indication of its charged state and means for automatically stabilizing the operating voltage of the measuring device, with plug-and-jack means for connecting the device to the control and transmission network of a subterranean installation, the plug-and-jack means including first contact means on the housing connected with the concentration-sensitive means of the measuring system for communicating an indication of the concentration of the component to a remote location, and second contact means connected with the circuit means of the analyser and connectable at the plug-and-jack junction with another transmission line for energization of the circuit means from a remote location to commence a gas-analysis cycle. The transmission of the measured value over a network of lines in the mine to a remote monitoring station, after the portable unit has been plugged into the net to constitute a temporarily fixed analysis station, is preferably carried out via a matching or equalizing resistor within the portable gas analyser. Furthermore, the circuit means advantageously includes a holding network in the form of a time-delay electronic switch which is momentarily triggerable to initiate operation of a timing sequence by a push button switch on the housing while the second contact means is connected to this holding circuit for initiating a similar sequence from the remote location.

The present invention thus permits a portable gas analyser to be used as a remote transmitting station for the value of the concentration of a component in the gas mixture; the system is particularly advantageous in that all of the timing circuitry is included within the portable housing so that only a single transmission line is required for the initiation of a measuring cycle although the sequence of operation involves a number of steps. Furthermore, the device can be readily removed from the remote monitoring network and operated by hand without necessitating continuous depression of the actuating button during the measuring operation.

Figure 2:
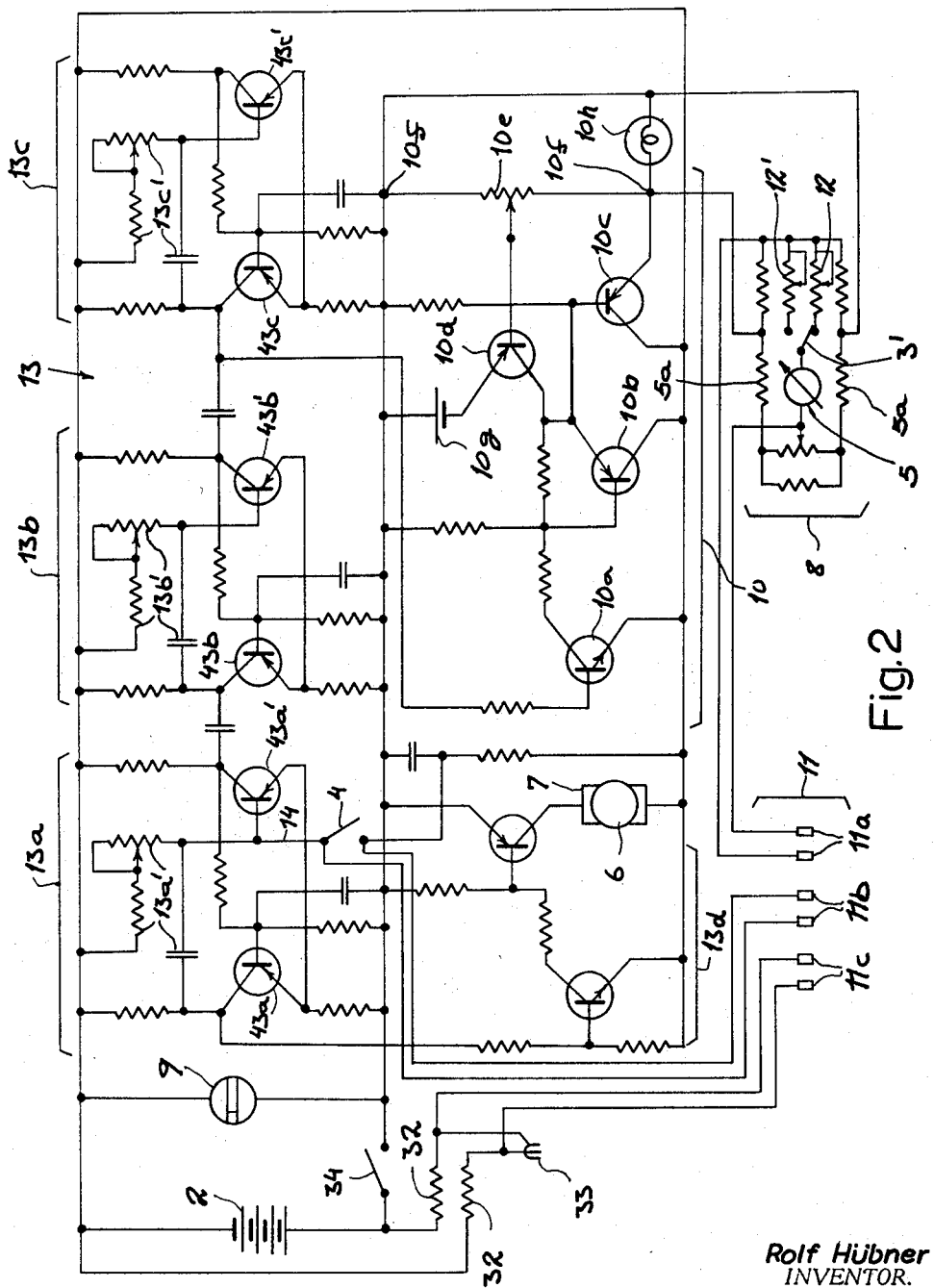

The above and other objects, features and advantages of the present invention will become more readily apparent from the following description reference being made to the accompanying drawing in which:

FIG. 1 is an elevational view, partly in diagrammatic form, of a portable gas analyser in accordance with this invention; and FIG. 2 is a circuit diagram of such an analyser.

Referring first to FIG. 1, it will be seen that a gas analyser in accordance with the present invention can comprise a housing 1 provided with a rechargeable source of electric current such as a battery as illustrated in my application Ser. No. 427,047 and diagrammatically shown at 2 in FIG. 2. The meter 3 represents the indicator of a measuring means and can be a galvanometer connected in the diagonal of a resistance-sensitive means responsive to the concentration of a component of a gas mixture. A pushbutton 4 is depressible to commence the measuring operation while a meter 9 is provided to show the state of charge of the battery, preferably in terms of measuring cycles remaining. A measuring chamber 5 communicates with the atmosphere via an inlet 5' and is provided with a pump 7 which, in turn, is driven by a motor 6 for aspirating a gas sample into the measure chamber 5 and flushing gas therefrom. The housing 1 is provided with a plug 11 whose contacts 11a, 11b and 11c will be described in greater detail with respect to FIG. 2 but are adapted to be received within a jack 20. The latter represents a station 21 at a fixed location in a mine or other subterranean cavern at which the analyser 1 is to be stationed. From the jack 20, a transmission line 22 runs through the mine and is connected to a plurality of similar stations and to a charging device represented diagrammatically at 23 as well as to a metering device 24 via a switchover system 25 permitting the personnel at the monitoring station to determine the state of charge at the analyzing station or to apply a charging current to the unit. Another transmission line 26 runs through the mine from the plug 20 to the monitoring station and terminates thereat in a switch 27 by means of which a measuring cycle can be commenced. Another set of transmission lines 28 connects the jack 20 with a recorder 29 or the like for indicating the concentration level of the particular component at the fixed station.

Referring now to FIG. 2, it can be seen that the measuring network 8 comprises a pair of resistors 5a illustrated as a substitute for the pair of spaced-apart electrodes which measure the electric resistance of the gas between them in the chamber 5 and thus provide a measure of the concentration of methane or carbon-monoxide which are catalytically oxidized in the usual maner within such chamber. The bridge 8 delivers its output to the galvanometer 3 and, when the plug-and-jack system 11, 20 is connected, to the remote monitoring station.

The circuit comprises the battery 2 which is chargeable through resistors 32 from the contacts 11c when the portable gas analyser 1 is one station in the mine or via a jack 33 when the instrument is being used as a portable unit and is returned to the home station with the attendant. To supervise the level of charge of the battery 2, I provide a voltmeter 9 which is calibrated in terms of number of measuring cycles remaining which can be connected across the battery 2 when the main on-off switch 34 is closed. When the latter is open, the measuring circuit of the apparatus is cut off and, if the unit is in place at its station 21, it can only be recharged and cannot be actuated to commence a measuring cycle. Thus any number of units may be placed throughout the mine and turned on or off via the switches 34. The indicating device 9 is illustrated in greater detail in my application Ser. No. 427,047.

Between the battery 2 and the measuring bridge 8, I provide a voltage-stabilizing circuit whose amplifier transistors 10a, 10b and 10c are provided with the usual biasing resistors and with a control transistor 10d whose base is connected to a potentiometer 10e across the output terminals 10f of the voltage-stabilizing network. The voltage-stabilizer 10 is similar to that described in my earlier applications and is conventional so that it need not be discussed in greater detail herein. A biasing battery 10q is provided for the voltage-sensing or control transistor 10d while a glow lamp 10h provides an indication on the "on" state of the measuring circuit.

As previously mentioned, the circuit includes a plug 11 for connecting the unit to the remote monitoring station by the control and transmission network of the mine. The plug contacts 11a of the circuit are bridged across the measuring instrument 3 preferably via equalizing resistor 12 which can be connected in circuit via a switch 3'. The latter can be set during portable operations of the unit such that a potentiometer 12' is connected in the measuring circuit to accommodate the latter to the particular indicating instrument 3 employed. Since the remote instrument 29 may have a different impedance, the switch 3' can be operated when the analyzer is mounted upon the station 21.

The measuring circuit 8 is energized via the timing circuit 13 which comprises three timing stages 13a, 13b and 13c in a ring-counter type R-C electronic switch chain. The individual stages 13a, 13b and 13c operate as described in my aforementioned copending applications and are designed to remain conductive for time periods determined by the time constants of R-C networks 13a', 13b' and 13c', respectively. Each network comprises a pair of transistors 43a, 43a', 43b, 43b', and 43c, 43c' together with the associated biasing resistors and inputs. Triggering is effected at the bases of the transistors 43a', 43b' and 43c'.

The circuit thus includes the switch 4 which is designed to energize the transistor 43a' at its base upon closure to commence a measuring cycle and thereby energize the motor 6 of the pump 7 via a voltage-control network 13d. The timing network 13a is operated for a duration equal to the "on time" of the motor 6 and thus determines the length of time over which a sample is drawn into the measuring chamber 5 and during which the flow of ambient gases purges this chamber of any prior residue. Upon termination of this pumping phase, the timing network 13b is energized to control the delay between inactivation of the pump means and thus the decrease in turbulence within the chamber 5 before the third timing network 13c is energized to bring into play the measuring circuit 8. The contacts 11b of plug 11 are connected across the switch 4 to deliver an impulse at 14 to the first stage 13a to commence a measuring cycle under the control of the remote station via switch 27. Thus the apparatus is operable both while being transported by the used and while in place at its remote station 21.

I claim:

1. In a portable gas analyzer for use as a direct indicator and a remote-indicating station to determine the concentration of a component of a gas mixture in a mine or the like which comprises a housing, a source of electric current in said housing, means in said housing forming a measuring chamber, concentration-sensitive means in said chamber responsive to said component for providing in indication of the concentration thereof, pump means in said housing operable for drawing ambient gas into said chamber, and circuit means energizable for actuating said pump means and said concentration-sensitive means, the combination therewith of: first contact means on said housing connected with said concentration-sensitive means and connectable with a transmission line for communicating an indication of the concentration of said component to a remote location; and second contact means on said housing connected with said circuit means and connectable with another transmission line for energization of said circuit means from a remote location to commence a gas-analysis cycle, said circuit means including a first timing network connected with said source and momentarily triggerable for commencing an analysis cycle, switch means on said housing connected with said first timing network for triggering same, said second contact means being bridged across said switch means for triggering said first timing network independently of said switch means, said first timing network being connected between said source and said pump means for operating same for a predetermined interval upon triggering of said first timing network, and another timing network connected between said source and said concentration-sensitive means for energizing same after a predetermined interval of operation of said pump means by said first timing network.

2. The combination defined in claim 1, further comprising voltage-stabilizing means connected between said source and said concentration-sensitive means, said circuit means including indicator means connectable with said source for providing a visual indication of the available power output of said source.

3. The combination defined in claim 2, further comprising third contact means on said housing connectable with another transmission line and coupled with said source for charging same from a remote location.

4. The combination defined in claim 3 wherein said timing networks each include a respective transistor switch and an RC network controlling said transistor switch.

5. The combination defined in claim 1 wherein said circuit means includes equalizing resistor means between said concentration-sensitive means and said first contact means.

References Cited

UNITED STATES PATENTS 2,743,167    4/1956    Cherry _____ 73—27

RICHARD C. QUEISSER, *Primary Examiner.*

IRVIN C. McCLELLAND, *Assistant Examiner.*